No. 762,235. PATENTED JUNE 7, 1904.
J. M. GREEN, DEC'D.
P. S. DARROHN, ADMINISTRATOR.
ACETYLENE GAS GENERATOR.
APPLICATION FILED SEPT. 20, 1899.
NO MODEL. 2 SHEETS—SHEET 2.

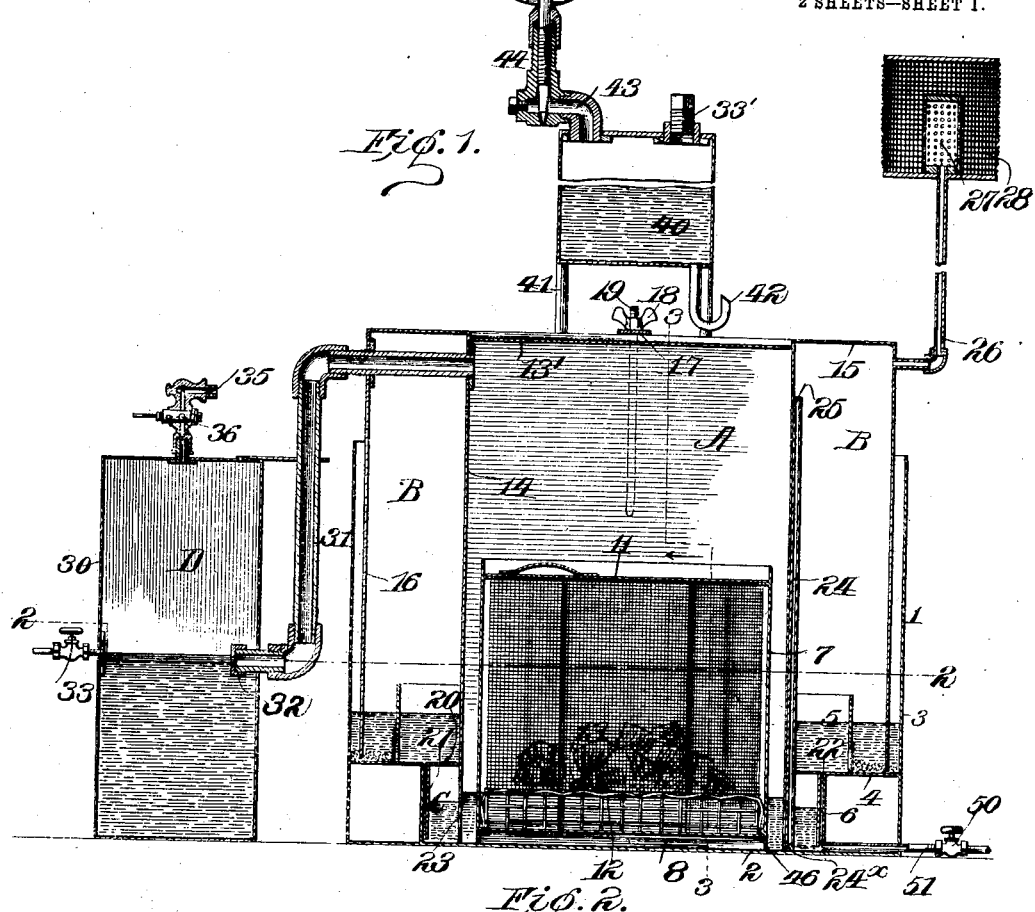

Fig. 3.

Fig. 4.

Witnesses.
Walter B. Payne.
Gwilland Rich.

Inventor,
Jerome M. Green
by Church & Church
his Attorneys

No. 762,235. Patented June 7, 1904.

UNITED STATES PATENT OFFICE.

JEROME M. GREEN, OF ROCHESTER, NEW YORK; PERRY S. DARROHN, ADMINISTRATOR OF SAID JEROME M. GREEN, DECEASED, ASSIGNOR TO RICHARD H. THURSTON, OF ELMIRA, NEW YORK.

ACETYLENE-GAS GENERATOR.

SPECIFICATION forming part of Letters Patent No. 762,235, dated June 7, 1904.

Application filed September 20, 1899. Serial No. 731,089. (No model.)

*To all whom it may concern:*

Be it known that I, JEROME M. GREEN, of Rochester, in the county of Monroe and State of New York, have invented certain new and useful Improvements in Gas-Generators; and I do hereby declare the following to be a full, clear, and exact description of the same, reference being had to the accompanying drawings, forming a part of this specification, and to the reference characters marked thereon.

My present invention relates to gas-generators in which the gas is produced by the action of moisture upon calcium carbid, and has for its object to provide a device whereby the flow of the liquid into contact with the carbid is controlled by the pressure of the gas in the generator and also to provide a simple and improved feeding device for furnishing a constant supply of water to the generator.

The invention has for its further object to provide a generator in which the water employed may be impregnated with sodium chlorid or other substance, whereby the rapid decomposition of the carbid will be retarded and the heat created by the chemical action occurring as the gas is produced will be greatly reduced, the quality of the gas improved, and its production more easily controlled.

To these and other ends my invention consists in certain improvements in construction and combinations of parts, all as will be clearly described, and the novel features pointed out in the claims at the end of this specification.

In the drawings, Figure 1 is a longitudinal sectional view of a generator constructed in accordance with my invention; Fig. 2, a vertical sectional view on the line 2 2 of Fig. 1; Fig. 3, a cross-sectional view on the line 3 3 of Fig. 1; Fig. 4, a view of the lower end of the governor-passage.

Similar reference characters in the several figures indicate similar parts.

The generator may be constructed in any desired form; but in the present embodiment I have shown the device as rectangular in form, having the outer casing 1. consisting of the bottom 2 and the side walls 3, having arranged near the bottom and parallel thereto the platform 4, supporting a vertical plate or wall 5 and connected at its inner edges by a vertical wall 6 to the bottom 2. The carbid-receptacle is adapted to rest upon the bottom 2, and consists of the casing 7, provided with the convex bottom 8, as shown. Provided in the sides of the receptacle are the open slits forming passages 9 between the overlapping portions 10 of the plates forming the sides of the receptacle, which permit the entrance of the liquid to the carbid and the escape of the gas from the receptacle.

11 indicates a removable cover for closing the receptacle, supported, as shown, upon inwardly-projecting flanges at the top of the receptacle. The carbid is supported upon the grating 12, arranged above the bottom 8, and to prevent a too rapid flow of liquid through the passages 9, as well as to prevent the hydrated carbid or slaked lime from being carried out of the receptacle by the action of the water, I cover the slits with a fine screening 13, provided upon the inside of the receptacle.

The dome or bell of the generator is adapted to be removed vertically from the outer shell or casing when the generator is to be charged and embodies an inner gas-chamber A and an air-chamber B surrounding the former. The inner chamber embodies the top 13' and the side portions 14, resting upon the bottom 2 and inclosing the carbid-receptacle, and the air-chamber is constructed with the top 15 and the side walls 16, adapted to extend a short distance from the inner sides of the walls 3 and in proximity to the platform 4, which supports the plate 5 above the bottom 2, forming a well or depression. The upper section or dome is adapted to be secured to the base of the receptacle 1 by means of a bar 17 and the thumb-nuts 18, threaded on the posts 19, secured to the opposite sides 3 of the base, or any other suitable fastening device. Arranged upon the outer surfaces of the walls or sides 14 and near their lower ends is a chamber C, inclosed by the walls 20 and 21, the latter extending parallel with and in proximity to the wall 6, forming the narrow passage 22 between them, and extending downward nearly to the bottom 2 of the receptacle 1. A series of apertures 23 are provided near the lower ends of the walls 14, affording communication between the inner gas-chamber and the chamber C. These apertures are arranged a short distance above the bottom 2, affording a space inside the gas-chamber in which sediment or ashes from the carbid that is carried out of the carbid-holder by the action of the water may be deposited without interfering with the operation, and when the apparatus is agitated, as when in use in a railway-car, for instance, the sediment will be arrested below the apertures and will not be carried into the passage at the sides of the well by the washing backward and forward of the liquid.

A governor in the form of a tube 24 is arranged upon the outer side of one of the walls 14, having the open end 25 in the chamber B, and its opposite extremity, located near the bottom 2, affords a passage for the escape of any air when the generator is first operated or for any excess of gas during its operation, as will be described. The lower end of this tube 24 is provided with a V-shaped notch $24^\times$ in its lower end, as shown in Fig. 4, so that the escape of air and gas will be gradual and the lights will not be caused to flicker. 26 indicates a pipe or exit-passage leading from the air-chamber to the external air and preferably outside of the room in which the generator is located, said pipe having a separator or distributer provided upon its extremity, consisting of the enlarged foraminous drum 27, inclosed in a casing 28, of wire-gauze or other foraminous material. This arrangement causes any gas which may escape through the pipe 26 to be finely divided and dispersed into the air in such small quantities that it is impossible to light the same and cause an explosion by the ignition of the gas in the chamber B.

Located at the side of the generator is a chamber or reservoir D, composed of the casing 30, containing a suitable liquid for washing and purifying the gas. The reservoir is connected to the gas-chamber A by means of a pipe 31, the outer end of which is provided with a cap or nozzle 32, having a restricted orifice adapted to discharge slightly below the surface of the said liquid in a horizontal direction.

33 indicates a drainage-cock arranged in the casing slightly above the level of the orifice in the nozzle 32 for the purpose of maintaining the liquid at the proper level, it being only necessary for the operator to open the drainage-cock to discharge an excess of liquid without the necessity of employing a glass gage or other means for determining the level in the reservoir. This arrangement it is found causes the liquid to be circulated horizontally in the reservoir by the force of the inflowing gas, which is emitted in a stream and is more thoroughly washed and cleansed, and by only submerging the inlet-orifice a short distance below the surface of the liquid the pressure in the gas-chamber and the reservoir is more nearly equal, and the gas will be allowed to flow from the former into the latter without a sudden reduction of the pressure in the said chamber, while the check-valve formed by the liquid will maintain any pressure that may exist in the reservoir, as will be understood. The service-pipe leading to the burners (indicated by 35) is connected with the reservoir D and is provided with a stop-cock 36, as shown, which may be closed to prevent the escape of gas while the generator is being recharged.

The top 13' of the gas-chamber is depressed slightly below the level of the top 15 of the surrounding air-chamber, and above the former is a reservoir 40, held upon a suitable support 41 and having the outlet-passage 42, provided with the open and upwardly-curved extremity, as shown. The reservoir is adapted to be filled with water and is provided with an aperture for this purpose normally closed by a screw plug or cap 33', and in the top is arranged an air-inlet passage 43, with which coöperates a needle-valve 44. By employing the outlet-passage with the upwardly-curved extremity and normally sealing or trapping the discharge-pipe preventing the entrance of the air I am enabled to regulate the flow of water to any desired amount by an adjustment of the needle-valve 44, allowing the air to be slowly drawn into the reservoir as the water falls, the flow of water being governed by the quantity of air admitted to the reservoir rather than by controlling the flow of the water by a valve through which it passes. This arrangement obviates the difficulty experienced by the stoppage of a water-valve by particles of sediment and impurities in the water.

In the operation of my device I preferably employ a strong or saturated solution of brine as the liquid for attacking the carbid, and while the solution may be prepared and introduced into the generator I prefer to supply the elements separately. In starting the operation the desired quantity of salt is placed on the platform 4 in the channel between the walls 3 and 5, and the water as it is introduced into the generator comes first into contact with the salt, dissolving a portion thereof before it can flow through the apertures 45, provided in the wall 5, which are preferably covered with a screen 54.

The operation of the device will now be understood. The sections of the generator being separated, the carbid is placed in the receptacle 7, the latter closed by the cover 11, and the necessary amount of salt is placed in the channel or holder on the platform 4, and the upper section consisting of the chambers A and B is then applied over the receptacle 1. In operating the generator it is first necessary to expel the air from the gas-chamber A, and to accomplish this easily and quickly without having to wait for the liquid or moisture to attack the carbid in the main carbid-receptacle I place a small piece of the carbid outside of the latter and beneath the curved bottom 8. A quantity of fresh water is now poured into the generator between the outer walls of the upper and lower sections and passes down in the channel between the walls 3 and 5, where a portion of the salt is dissolved before it has had an opportunity to flow through the relatively small apertures 45. The first portion of the water as it is introduced into the generator will flow through the passages 45 and 22 into the bottom of the casing 1 without having absorbed a sufficient amount of the salt to affect its action on the carbid beneath the curved bottom 8, and coming into contact with the loose carbid will rapidly produce a quantity of gas, which forces the water out of the gas-chamber and escaping from beneath the receptacle through the apertures 46 will pass into the chamber A, displacing the air, as the gas is warm and will rise to the top, forcing the air and a small portion of gas out through the apertures 23 into the chamber C, from whence it escapes through the small pipe or governor 24 into the chamber B and thence to the atmosphere through the vent-pipe 26. As the entrance 24× to the pipe 24 is very small and the upper end of the said entrance is above the lower extremity of the vertical passage 22 at the sides of the well through which the water in the outer receptacle is forced back, the water in the pipe will be drained out and the first gas and air can escape through said pipe 24 before it raises the water in the narrow space next the walls of the well sufficiently high to allow it to flow out beneath the outer wall 21 of chamber C. It will be understood that as soon as the pressure in the chamber A is reduced by the outflowing gas the liquid rising again in the chamber C effectually closes the end of the pipe 24, forming a seal against the return of the air or gas therethrough. The piece of carbid employed for this preliminary starting of the generator is only large enough to clear the apparatus of air and prevents the main body of carbid from being attacked until the gas-exit pipe is opened. The valve or cock 36 has been closed during this period of operation, so that none of the gas has passed into the reservoir D, and the pressure created in the gas-chamber A will expel the air therefrom, as described, and preventing the further inflow of the water to the carbid, retaining the water in the passages until the pressure in the chamber is reduced to less than the weight of water between the casings. When the valve 36 in the service-pipe is opened, the gas in the chamber is allowed to pass into the reservoir and the liquid in the outer receptacle is allowed to flow through the passage 22 and the aperture 23 into the chamber A and as it rises passes through the slits or passages 9 in the sides of the carbid-receptacle, attacking the carbid and producing gas until sufficient pressure has been produced to expel the liquid from the receptacle. As the liquid is expelled from the interior of the generator it is forced upward through the passage 22 into the air-chamber B and by the force of gravity exerts a constant pressure upon the gas in the chamber A. The gas-pressure maintains the level of liquid in the carbid-chamber just below the fresh carbid, as any decrease allows the liquid to flow upward and attack it, while any excess of pressure will force the liquid entirely out of the carbid-chamber and up through the passages 22, and the gas can escape into the chamber B and thence pass to the external air without entering the room where the apparatus is located. The wire cage at the bottom of the carbid-chamber permits the fine ashes or hydrated carbid to drop to the bottom, so that when the liquid rises again it will come in contact with fresh carbid, and when it is expelled by the pressure the carbid will be drained.

The employment of brine as the liquid I find in practice produces a much better quality of acetylene gas than where fresh water is employed and with the evolution of considerably less heat, and, moreover, by reason of its freezing at a very low temperature the apparatus is susceptible of use out of doors or in places where it is subjected to extreme cold without danger of freezing.

One of the principal features of this apparatus is the location of the carbid-chamber inside of a chamber communicating with the external air by a passage, so that the air in the generator (and perhaps a small quantity of gas) is expelled when the generation of gas is first started and whereby, also, in case of excessive generation of gas the liquid is removed from the carbid and the gas is conducted away from the apparatus.

The apparatus is self-regulating, and it is only necessary to supply it with carbid and liquid in sufficient quantities to produce excellent results.

It has been found in practice that gas generated by the action of a brine solution alone upon calcium carbid when ignited gives a slight tinge of yellow to the edges of the flame, which continues until the liquid has been thoroughly mixed with the ashes or residue of the decomposed or hydrated carbid. To prevent this appearance of the flame when it is desired to use the gas immediately after starting the operation of the generator and before sufficient time has elapsed to allow the solution to become mixed with the ashes or residue, I employ upon each recharging of the generator the liquid remaining therein after the carbid has been exhausted and which may be drawn off from the casing 1 by means of the valve 50 and the pipe 51, arranged at the bottom of the casing. This solution also contains a large percentage of the salt previously introduced into the generator, so that by a subsequent use of the same solution only enough additional salt is required to impregnate the fresh water employed. When this solution is used a second time, I first apply to the generator a small quantity of fresh water, which will pass directly into the generator to act upon the loose carbid placed beneath the receptacle, as before described, and after this action has commenced I introduce the solution.

The valve 44 of the reservoir 40 is adjusted to supply a steady drip of water upon the depressed top 13 of the chamber A, serving the double purpose of keeping the latter cool and, as the excess of water will overflow into the generator, to also compensate for the reduction of the liquid by evaporation.

I claim as my invention—

1. In a gas-generator, the combination with an outer section or receptacle open at the top and adapted to contain a liquid, of an upper section or casing having a gas-chamber and a surrounding air-chamber, both open at the bottom, an escape-passage leading from the air-chamber, a liquid-sealed passage between the two chambers, said passage leading from the bottom of the generator to the air-chamber above the liquid in the latter, and a holder for gas-generating material in the gas-chamber.

2. In a gas-generator, the combination with an outer section or receptacle open at the top and having a well at the bottom and adapted to contain a liquid, of an upper section or casing having the gas-chamber provided with walls extending close to the sides of the well, an air-chamber surrounding the gas-chamber and having the walls extending close to the bottom of the outer section above the well, an escape-passage communicating with the air-chamber, and a holder for gas-making material in the gas-chamber.

3. In a gas-generator, the combination with an outer section or receptacle open at the top and adapted to contain a liquid, of an upper section or casing having a gas-chamber, an air-chamber adjacent thereto both chambers being open at the bottom, an escape-passage from the air-chamber, a small governor-passage between the gas and air chambers opening into the former above the bottom of the latter, normally closed and controlled by the liquid in the casing and a holder for gas-making material arranged above the entrance to the governor-passage.

4. In a gas-generator, the combination with the outer section or receptacle open at the top and adapted to contain a liquid, of an upper section having a gas-chamber and an air-chamber in proximity thereto, both chambers being open at the bottom and adapted to have their lower ends submerged in the liquid, a passage leading from the former to the latter chamber having its open end arranged above the bottom of the air-chamber and normally closed by the liquid, and a carbid-holder in the gas-chamber having a carbid-support arranged above the bottom of the outer receptacle.

5. In a gas-generator, the combination with the outer section or receptacle adapted to contain a liquid, of a gas-chamber in the outer section and communicating therewith near the bottom, an air-chamber surrounding the gas-chamber and having the wall extending over the point of communication between the gas-chamber and receptacle, a passage leading from the gas-chamber to the air-chamber, an escape-passage between the gas and air chambers leading from a point above the bottom of the air-chamber, a carbid-holder in the gas-chamber and having its bottom arranged above the bottom of the outer receptacle.

6. In a gas-generator, the combination with the outer receptacle open at the top and adapted to contain a liquid, of a gas-chamber opening at the bottom into the receptacle, an air-chamber having the downwardly-extending wall over the opening between the receptacle and the gas-chamber extending beneath the surface of the liquid in the receptacle, an outlet-passage from the gas-chamber leading to the air-chamber from a point between the bottom of the latter and the surface of the liquid, an escape-passage leading from the air-chamber, and a carbid-holder in the gas-chamber having its bottom arranged above the passage between the gas-chamber and the outer receptacle.

7. In a gas-generator, the combination with the outer receptacle open at the top and adapted to contain a liquid, of a gas-chamber closed at the top and communicating by a narrow passage with the receptacle at the bottom, a small air-escape pipe having its lower open end arranged between the gas-chamber and the passage from the latter to the receptacle, and a carbid-holder in the gas-chamber having its bottom arranged above the bottom of the receptacle.

8. In a gas-generator, the combination with the outer receptacle open at the top and adapted to contain a liquid, a gas-chamber open at the bottom and disposed in the receptacle, and a carbid-holder arranged in the gas-chamber, provided with the vertically-extending slots at the sides, the walls of the same being formed by overlapping plates, the latter forming indirect passages into the holder, and the carbid-support arranged above the bottom of the outer receptacle.

9. The combination with the outer receptacle open at the top and having the well at the bottom, of the gas-chamber open at the bottom having walls extending down in close proximity to the walls of the well, the air-chamber surrounding the gas-chamber having the walls extending over the upper ends of the walls of the well, an exit-passage from the air-chamber, and a carbid-holder in the gas-chamber.

10. In a gas-generator, the combination with an open receptacle adapted to contain a liquid, of a gas-chamber located therein open at the bottom but normally sealed by the liquid, an air-chamber surrounding the gas-chamber, a perforated carbid-support in the gas-chamber elevated above the bottom thereof, and a gas-escape pipe open at its upper end and having its lower end extending close to the bottom of the gas-chamber and above the bottom of the air-chamber, and normally sealed by the liquid in the casing.

11. In a gas-generator, the combination with the outer receptacle adapted to contain a liquid, a gas-chamber open at its lower end, arranged within the receptacle and having a gas-outlet, and a valve for controlling it, a carbid-holder in the chamber, an auxiliary carbid-chamber beneath the holder and separated therefrom by an imperforate partition, and an escape-passage leading to the exterior of the gas-chamber normally sealed by the liquid in the casing.

12. In a gas-generator, the combination with a gas-chamber, a means for supplying liquid at the bottom thereof, of a carbid-holder in the chamber having the raised perforated bottom, the vertically-slotted sides, and the plates covering said slots forming indirect passages to the interior of the holder.

13. In a gas-generator, the combination with a gas-chamber, and means for supplying liquid to the bottom thereof, of a carbid-holder in the chamber embodying a casing having apertures in the sides, a covering for said apertures, and a raised perforated bottom.

14. In a gas-generator, the combination with an outer receptacle adapted to contain liquid and having a perforated basket or retainer for soluble material, as salt, of a gas-chamber arranged in the receptacle and open at the bottom, and a carbid-holder located therein.

15. In a gas-generator, the combination with an outer receptacle adapted to contain a liquid, of a gas-chamber arranged in the receptacle, said gas-chamber having the recessed top and being open at the bottom for the escape of gas under excessive pressure but normally sealed by the liquid, a carbid-holder in the chamber, a liquid-supplying device arranged above the chamber and means for controlling the continuous flow of liquid to the top of the chamber, whereby the top will be cooled and the liquid may run down the sides of the chamber into the receptacle.

16. In a gas-generator, the combination with an outer receptacle adapted to contain a liquid, and an air-chamber arranged in the receptacle having the closed top and the open bottom, of a gas-chamber surrounded by the air-chamber having the top arranged below that of the air-chamber and having the open bottom, passages between the gas and air chambers normally sealed by the liquid in the receptacle, and means for applying liquid to the top of the gas-chamber, whereby said top will be cooled and the liquid may flow over the top of the air-chamber and pass into the receptacle.

17. In a gas-generator, the combination with the receptacle having a well at the bottom and adapted to contain a liquid, a gas-chamber having walls extending into the well, an air-chamber around the gas-chamber having the walls extending outwardly beyond the walls of the well, a perforated partition at the top of the well for retaining material, such as salt, and a carbid-holder arranged in the gas-chamber.

18. In a gas-generator, the combination with the outer casing or receptacle adapted to contain a liquid having a well in its bottom, the upper casing having the central gas-chamber having the walls extending down into the well, and the chamber C closed at the top and opening into the gas-chamber, the outer air-chamber having walls extending over and above the well, and a carbid-holder located in the gas-chamber.

19. In a gas-generator, the combination with the outer receptacle open at the top and adapted to contain a liquid, of a chamber opening at the bottom into the receptacle, a carbid-holder in the chamber, and a partition or wall 14 arranged between the carbid-holder and the opening between the outer receptacle and the chamber, whereby the said opening will be prevented from becoming clogged by ashes from the carbid.

20. In a gas-generator, the combination with the outer section or receptacle adapted to contain a liquid, of a gas-chamber in the outer section communicating therewith at the bottom of the receptacle having the wall 14, an air-chamber having the downwardly-extending wall 21 over the opening between the receptacle and the gas-chamber, a carbid-holder in the latter, the partition or wall 14 between the carbid-holder and the opening of said chamber being arranged between the air-chamber and receptacle, whereby the said opening will be prevented from becoming clogged by ashes from the carbid.

21. In a gas-generator, the combination with the outer receptacle having a well in its bottom, of the inner section having the central gas-chamber, and walls at the sides thereof extending down into the well and in proximity to the sides thereof, and the overhanging edge extending laterally beyond the upper end of the well in the receptacle forming an outer chamber with the lower edges at a higher level than those of the gas-chamber, and a passage leading from the outer chamber to the air.

JEROME M. GREEN.

Witnesses:
G. WILLARD RICH,
G. A. RODA.